(12) United States Patent
Wang (10) Patent No.: US 10,819,092 B2
(45) Date of Patent: Oct. 27, 2020

(54) BOX-TYPE WIRE STRIPPER

(71) Applicants: HANGZHOU GREAT STAR INDUSTRIAL CO., LTD., Hangzhou (CN); HANGZHOU GREAT STAR TOOLS CO., LTD., Hangzhou (CN)

(72) Inventor: Min Wang, Hangzhou (CN)

(73) Assignees: HANGZHOU GREAT START INDUSTRIAL CO., LTD., Hangzhou (CN); HANGZHOU GREAT STAR TOOLS CO., LTD., Hangzhou (CN)

( * ) Notice: Subject to any disclaimer, the term of this patent is extended or adjusted under 35 U.S.C. 154(b) by 0 days.

(21) Appl. No.: 16/467,695

(22) PCT Filed: Aug. 7, 2017

(86) PCT No.: PCT/CN2017/096186
§ 371 (c)(1),
(2) Date: Jun. 7, 2019

(87) PCT Pub. No.: WO2019/028586
PCT Pub. Date: Feb. 14, 2019

(65) Prior Publication Data
US 2019/0372319 A1    Dec. 5, 2019

(51) Int. Cl.
*H02G 1/12* (2006.01)
(52) U.S. Cl.
CPC .................. *H02G 1/1251* (2013.01)
(58) Field of Classification Search
CPC .... H02G 1/1251; H02G 1/1214; H02G 1/126; H02G 1/1212; H02G 1/1241; H02G 1/1234; H01B 15/006; Y02W 30/821; B25B 15/00; B25B 23/16; B25G 1/105; B21F 13/00
USPC .... 30/390, 90.9, 90.4, 90.8, 262, 91.1, 91.2, 30/90.1, 125, 241; 81/9.43, 9.41, 9.4, 81/9.42, 9.44
See application file for complete search history.

(56) References Cited

U.S. PATENT DOCUMENTS

| | | | | | |
|---|---|---|---|---|---|
| 2,619,724 | A | * | 12/1952 | Manthey | ................... B26B 5/00 30/336 |
| 3,914,864 | A | * | 10/1975 | Prince | ..................... B21F 13/00 30/90.6 |
| 5,956,789 | A | * | 9/1999 | Chou | ..................... B25B 15/00 30/90.1 |
| 7,137,204 | B2 | * | 11/2006 | Wiste | ................... H02G 1/1214 30/90.1 |
| 2009/0188349 | A1 | * | 7/2009 | Hanning | ............... H02G 1/1241 81/9.43 |

(Continued)

FOREIGN PATENT DOCUMENTS

| | | |
|---|---|---|
| CN | 203607759 U | 5/2014 |
| CN | 204441808 U | 7/2015 |
| CN | 204992442 U | 1/2016 |

(Continued)

*Primary Examiner* — Ghassem Alie
(74) *Attorney, Agent, or Firm* — Burns & Levinson LLP; John C. Serio (57) ABSTRACT

A box-type wire stripper includes a retractable box body having a variable height and including at least one box body side wall; and at least one wire stripping device for partially or entirely stripping a wire sheath covering a wire core, and each wire stripping device is arranged on one box body side wall.

15 Claims, 8 Drawing Sheets

(56) References Cited

U.S. PATENT DOCUMENTS

2012/0167719 A1    7/2012  Newman
2014/0345143 A1*  11/2014  Newman .............. H01B 15/006
                                                           30/90.9

FOREIGN PATENT DOCUMENTS

CN         106505487 A    3/2017
CN         206302099 U    7/2017

* cited by examiner

BOX-TYPE WIRE STRIPPER

CROSS REFERENCE TO RELATED APPLICATIONS

This application is the U.S. national phase entry under 35 U.S.C. § 371 of International Application No. PCT/CN2017/096186, filed Aug. 7, 2017, entitled BOX-TYPE CABLE STRIPPER, the contents of which are incorporated herein by reference in their entirety for all purposes.

FIELD OF THE INVENTION

The present invention relates to a wire stripping tool for processing a wire by a user, and in particular, to a box-type wire stripper.

DESCRIPTION OF THE PRIOR ART

The existing wire stripping tools are mainly wire stripping pliers, usually sheet metal parts, with a cutting edge ground out, using a dipped PVC handle as the handle, or adding a wire stripping hole structure to a conventional tool (such as a pair of pliers, a cutting tool, or the like), so as to function.

The existing wire has relatively diverse applications and functions, and has a variety of diameter specifications, so as to be adapted to various situations. The prior wire stripping pliers can only handle limited types and specifications of the wires due to the limited space of their front clamping portion, such that one pair of pliers is difficult to be applied for all specifications. As for those of pliers that are able to strip wires of various specifications, the clamping portion thereof is relatively long, and the handheld portion thereof is even longer than the clamping portion. Therefore, such a pair of wire stripping pliers has relatively long length, and occupies a relatively large space, which makes it not convenient to carry.

In addition, when using wire stripping pliers to strip wires, the stripped wire sheaths are in a mess, and are difficult to clean up.

Those skilled in the art are endeavored to developing a box-type wire stripper which can be provided with wire stripping devices of various sizes, and can strip wires of a variety of different specifications and types.

SUMMARY OF THE INVENTION

The object of the present invention is to provide a box-type wire stripper, so as to solve the technical problems of the pair of wire stripping pliers in the prior art of a relatively long length, fewer adapted wire specifications and inconvenient disposition of the stripped wire sheaths.

In order to solve the above-mentioned technical problems, the present invention provides a box-type wire stripper, including a retractable box body with a variable height, including at least one box body side wall; and at least one wire stripping device for partially or entirely stripping a wire sheath covering a wire core, each wire stripping device arranged on one box body side wall.

Further, in a different embodiment, the retractable box body includes a first housing; a second housing, arranged opposite to the first housing; and at least one retractable device for adjusting a distance between the second housing and the first housing.

Further, in a different embodiment, the retractable device includes a guide hole, penetrating through the first housing; a guide groove, arranged on a lower surface of the second housing, opposite to the guide hole; and a guide post, protruding from the bottom of the guide groove, with a front end extending into the guide hole.

Further, in a different embodiment, the retractable device includes an annular step, protruding from the middle of an inner side wall of the guide hole; an annular gasket, arranged in the guide hole and located below the annular step; and a bolt, including integrally arranged base and threaded rod, the base is arranged in the guide hole, and is located below the annular gasket; and the threaded rod passes through the annular gasket and the annular step successively and is connected to the guide post.

Further, in a different embodiment, a stepped hole is formed in the middle of the annular step; a gasket through hole is arranged in the middle of the annular gasket, opposite to the stepped hole; the threaded rod passes through the gasket through hole and the stepped hole successively and is connected to the guide post.

Further, in a different embodiment, the retractable device includes an elastic member, with one end connected to the first housing, and the other end connected to the second housing.

Further, in a different embodiment, the elastic member is a compressible spiral spring, sheathing one guide post; one end of the elastic member is arranged in one guide hole, and is connected to an upper surface of the annular step; the other end of the elastic member is arranged in the guide groove corresponding to the guide hole.

Further, in a different embodiment, a lower surface of the first housing is parallel with an upper surface of the second housing; a central axis of the spiral spring is vertical to the lower surface of the first housing or the upper surface of the second housing.

Further, in a different embodiment, when the number of the retractable device is one, a center of gravity of the retractable box body is located on the central axis of the retractable device; when the number of the retractable device is two, the center of gravity of the retractable box body is located on a center line of a connection surface of the two retractable devices; when the number of the retractable device is three or more, the center of gravity of the retractable box body is located on the central axis of a three-dimensional structure enclosed by a plurality of retractable devices.

Further, in a different embodiment, a side wall of the retractable box body is a plane or a curved surface, including a first housing side wall, which is one side wall of the first housing; and a second housing side wall, which is one side wall of the second housing.

Further, in a different embodiment, the wire stripping device includes a first blade, arranged on one first housing side wall, with an edge facing toward the second housing; and a second blade, arranged on one second housing side wall, with an edge facing toward the first housing, the second housing side wall and the first housing side wall are located on the same side wall of the retractable box body; when the retractable box body is compressed to the minimum height, an inner side wall of the first blade is tangent to an outer side wall of the second blade.

Further, in a different embodiment, in the case that the box body side wall is a plane, the first blade and the second blade are planar blades; in the case that the box body side wall is a curved surface, the first blade and the second blade are cambered blades, and have the same cross-sectional shape as that of the box body side wall.

Further, in a different embodiment, the first blade is detachably assembled to the first housing side wall; the second blade is detachably assembled to the second housing side wall.

Further, in a different embodiment, the wire stripping device includes a first blade latching slot, arranged at a ridge of the first blade; a first housing side wall groove, recessed in an outer surface of the first housing side wall; a first housing side wall block, protruding from a bottom surface of the first housing side wall groove, and snap fitted into the first blade latching slot.

Further, in a different embodiment, the wire stripping device includes two or more first blade snap notches, arranged at the edges of two ends of the first blade respectively; two or more first snap protrusions, protruding from the inner side wall of the first housing side wall groove, each first snap protrusion snap fitted into one first blade snap notch.

Further, in a different embodiment, the wire stripping device includes a second blade latching slot, arranged at a ridge of the second blade; a second housing side wall groove, recessed in an outer surface of the second housing side wall; and a second housing side wall block, protruding from a bottom surface of the second housing side wall groove, and snap fitted into the second blade latching slot.

Further, in a different embodiment, the wire stripping device includes two or more second blade snap notches, arranged at the edges of two ends of the first blade respectively; two or more second snap protrusions, protruding from the inner side wall of the first housing side wall groove, each second snap protrusion snap fitted into one first blade snap notch.

Further, in a different embodiment, the wire stripping device includes a first blade through hole, penetrating through the first blade; a first housing side wall through hole, penetrating through the first housing side wall; and a fastener, passing through the first blade through hole and the first housing side wall through hole successively, for fixing the first blade and the first housing together.

Further, in a different embodiment, the wire stripping device includes a second blade through hole, penetrating through the second blade; a second housing side wall through hole, penetrating through the second housing side wall; and a fastener, passing through the second blade through hole and the second housing side wall through hole successively, for fixing the second blade and the second housing together.

Further, in a different embodiment, the wire stripping device includes at least one first edge groove, recessed in an outer side wall of the first blade, and extending to the edge of the first blade, forming a first edge notch; and at least one second edge groove, recessed in an inner side wall of the second blade, and extending to the edge of the second blade, forming a second edge notch, disposed opposite to the first edge notch.

Further, in a different embodiment, in the course of compressing the retractable box body, when the height of the lowest end of the edge of the second blade is equal to or less than the height of the top end of the edge of the first blade, the first edge notch and the second edge notch corresponding to each other enclose a wire stripping hole; the length of the wire stripping hole is directly proportional to the height of the retractable box body.

Further, in a different embodiment, an included angle of 0-60 degrees is formed between a central axis of the first edge groove and the second edge groove and the box body side wall.

Further, in a different embodiment, when the number of the box body side wall is one, the box body side wall is an annular curved surface; when the number of the box body side wall is two, the two box body side walls include one arc surface and one plane, or include two arc surfaces; when the number of the box body side wall is three or more, any box body side wall is a plane or an arc surface.

Further, in a different embodiment, when the number of the retractable device is one, a center of gravity of the retractable box body is located on the central axis of the retractable device; when the number of the retractable device is two, the center of gravity of the retractable box body is located on a center line of a connection surface of the two retractable devices; when the number of the retractable device is three or more, the center of gravity of the retractable box body is located on the central axis of a three-dimensional structure enclosed by a plurality of retractable devices.

Further, in a different embodiment, the retractable box body includes a sunken groove, recessed in the lower surface of the first housing; and/or recessed in the upper surface of the second housing.

Further, in a different embodiment, the retractable box body includes a first shell, partially or entirely covering an outer surface of the first housing; and a second shell, partially or entirely covering an outer surface of the second housing; the first shell and/or the second shell is made of an elastic material.

Further, in a different embodiment, the retractable box body includes a base plate, detachably mounted to the first housing, and/or the second housing.

Further, in a different embodiment, the box-type wire stripper further includes a scale marking, arranged on an outer side wall of the retractable box body, for measuring the length of the wire.

The beneficial effects of the present invention are that the present invention provides a box-type wire stripper simultaneously provided with a plurality of wire stripping devices, which can be used for stripping wires in a variety of different models and of different sizes, and satisfies the wire stripping requirements of most of the users. The box-type wire stripper according to the present invention is simple to operate and convenient to carry, and is readily promoted for large-scale application.

REFERENCE NUMERALS 1 retractable box body, 2 wire stripping device, 3 wire stripping hole;

11 first housing, 12 second housing, 13 retractable device, 14 first shell, 15 second shell, 16 box cavity, 17 base plate, 18 scale marking;

21 first blade, 22 second blade, 23 first blade latching slot, 24 first blade through hole, 25 first fastener, 26 second blade latching slot, 27 second blade through hole, 28 second fastener;

111 first housing side wall, 112 first housing side wall groove, 113 first housing side wall block, 114 first housing side wall through hole, 115 first snap protrusion;

121 second housing side wall, 122 second housing side wall groove, 123 second housing side wall block, 124 second housing side wall through hole, 125 second snap protrusion, 126 sunken groove;

131 spiral spring, 132 guide hole, 133 guide groove, 134 guide post, 135 annular step, 136 annular gasket, 137 bolt;

211 first edge groove, 212 first edge notch, 213 first blade snap notch;

221 second edge groove, 222 second edge notch; 213 second blade snap notch;

1351 stepped hole, 1361 gasket through hole, 1371 base, 1372 threaded rod.

DETAILED DESCRIPTION OF THE PREFERRED EMBODIMENTS

The preferred embodiments of the present invention will be described fully hereinafter with reference to the accompanying drawings of the description, so that the technical contents thereof will be more clearly and easily understood. The present invention may be embodied in many different forms of embodiments, and the scope of which is not limited to the embodiments mentioned herein.

In the drawings, the components having same structures are denoted by same reference numerals, and the components having similar structures or functions are denoted by similar reference numerals. The dimension and thickness of each of the components shown in the drawings are shown arbitrarily, and the present invention does not limit the dimension and thickness of each of the components. In order to make the illustration clearer, the thickness of the component is appropriately exaggerated in some places in the drawings.

The directional words mentioned in the present invention, such as upper, lower, front, back, left, right, inner, outer, side, top, bottom, top end, bottom end, terminal end, etc., are only the directions in the drawings and are only intended to explain and illustrate the present invention, but not to limit the protection scope of the present invention.

When a certain component is described as being "on" another component, the component may be placed directly on another component; an intermediate component may also be present, the component is placed on the intermediate component, and the intermediate component is placed on another component. When a component is described as being "mounted to" or "connected to" another component, the two may be understood to be directly "mounted" or "connected", or one component is indirectly "mounted" or "connected to" another component via an intermediate component.

Embodiment 1

Figure 1:
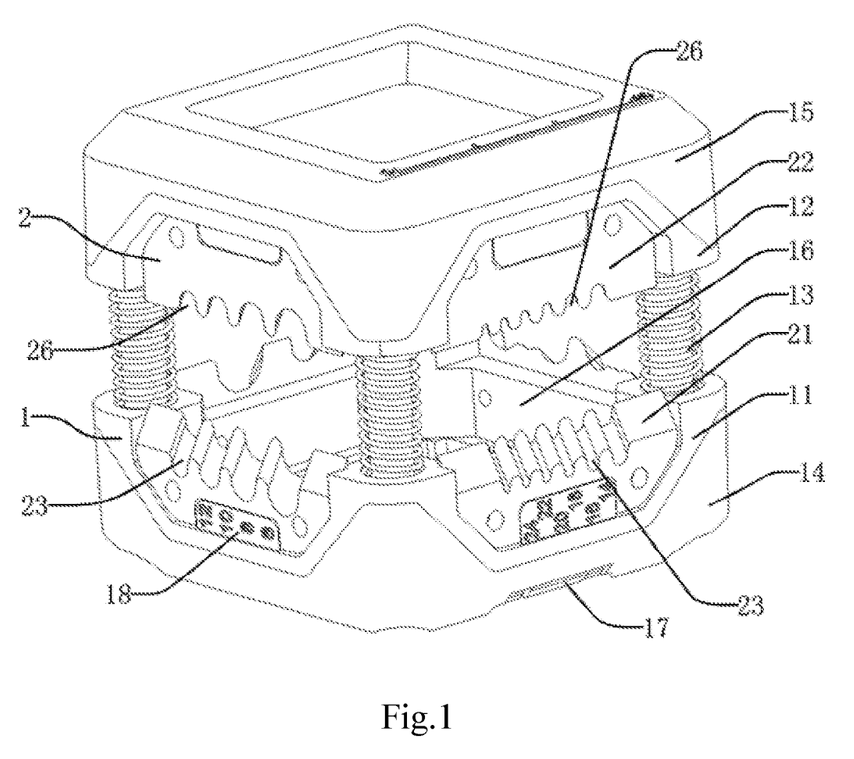
FIG. 1 is an overall structural schematic diagram of Embodiment 1 according to the present invention.

The present embodiment provides a box-type wire stripper for stripping various wires. The wire includes a wire core and a wire sheath covering an outer surface of the wire core. As shown in FIG. 1, the box-type wire stripper includes a retractable box body 1 and at least one wire stripping device 2.

In the present embodiment, the retractable box body 1 preferably has a shape of rectangular parallelepiped or cube, including a box body bottom surface, a box body top surface, and four box side surfaces. In other embodiments, the retractable box body 1 may also be a sphere, a cylinder, a polygon prism, or the like.

The box body bottom surface is the lower surface of the first housing 11, and the box body top surface is the upper surface of the second housing 12. In the present embodiment, each box body side wall is preferably a plane, or a curved surface in other embodiments, for example a spherical surface or an arc surface. The lower part of each box body side wall is one side wall of the first housing 11, and may be referred to as a first housing side wall 111; the upper part of the box body side wall is one side wall of the second housing 12, and may be referred to as a second housing side wall 121; the first housing side wall 111 and the second housing side wall 121 opposite to each other are located on the same plane or the same curved surface. When the retractable box body 1 is not compressed, a distance is kept between the second housing 12 and the first housing 11, and the middle of the box body side wall is empty. The retractable box body 1 has a variable height. In the case that the retractable box body 1 is compressed to the minimum height, the second housing 12 is fitted to the first housing 11.

In the present embodiment, the retractable box body 1 includes a first housing 11 and a second housing 12 arranged opposite to each other, and four retractable devices 13 therebetween.

The first housing 11 and the second housing 12 have an overall shape approximate to a rectangular parallelepiped, with the same length and width correspondingly. The second housing 12 is located above the first housing 11, the lower surface of the second housing 12 is arranged opposite to the upper surface of the first housing 11, and the upper surface of the second housing 12 is parallel with the lower surface of the first housing 11. Both the first housing 11 and the second housing 12 are provided therein with hollow cavities opposite to each other, to enclose a box cavity 16. Four retractable devices 13 are arranged at four corners of the retractable box body 1 respectively, for adjusting the distance between the second housing 12 and the first housing 11.

The retractable device 13 includes a retractable elastic member, with one end connected to the first housing 11 and the other end connected to the second housing 12. In the present embodiment, the elastic member is preferably a compressible spiral spring 131. In the case that the number of the retractable device 13 is plural, the elastic member needs to be mounted on a certain or some retractable device(s) 13, while no elastic member needs to be mounted on other retractable devices 13, as long as an elastic force of the existing elastic member is great enough to support the second housing 12.

Figure 3:
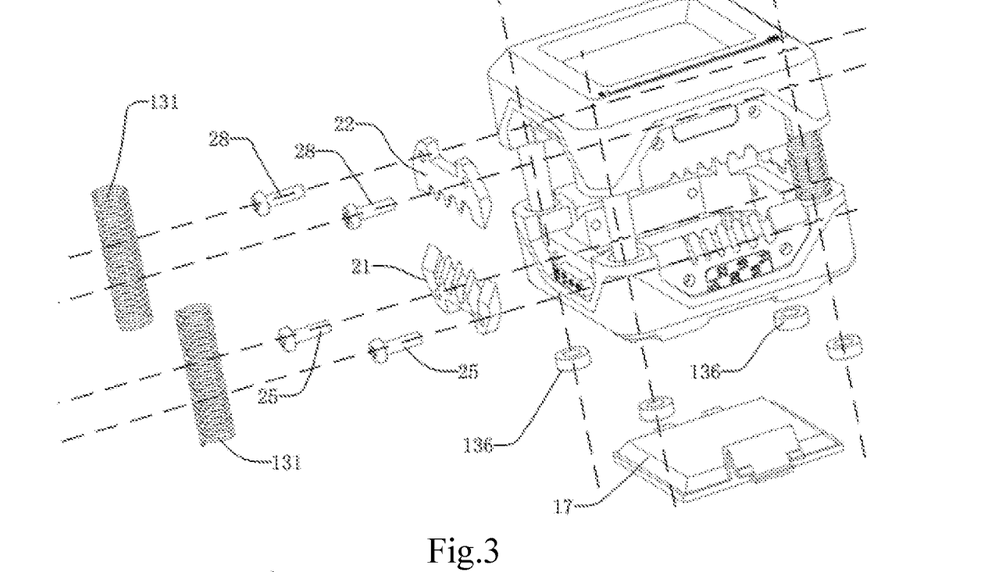
FIG. 3 is an exploded structural schematic diagram of Embodiment 1 according to the present invention.
Figure 5:
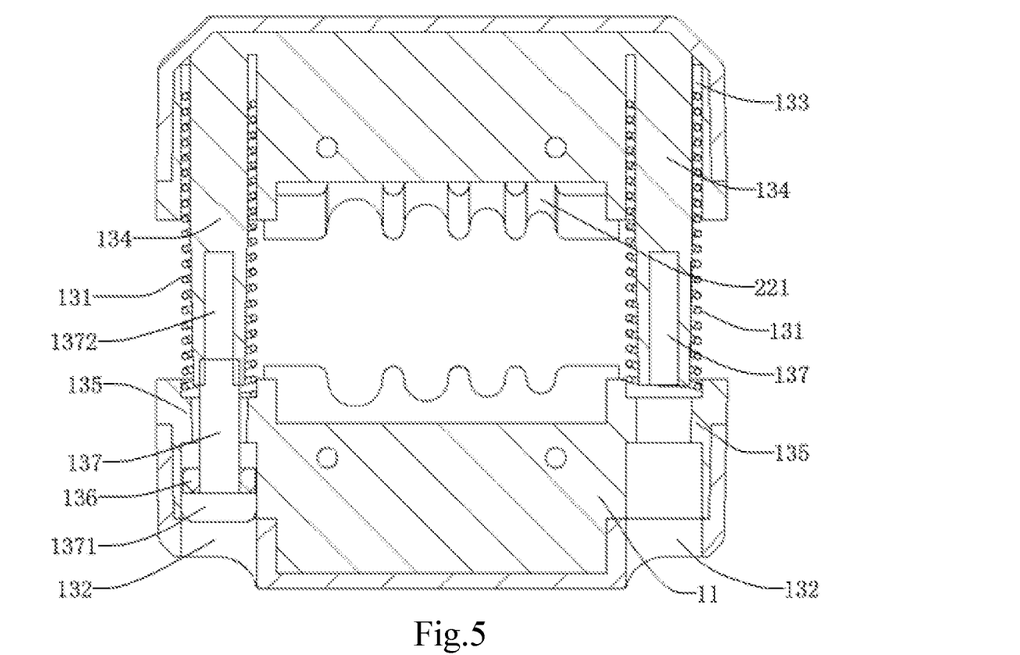
FIG. 5 is a sectional view taken along AA in FIG. 4.

As shown in FIGS. 3 and 5, the retractable device 13 further includes a guide hole 132, a guide groove 133 and a guide post 134. Preferably, four sets of guide holes 132, guide grooves 133 and guide posts 134 are arranged at four corners of the retractable box body 1, and the elastic member may be mounted. In the case that a force is exerted on the upper and lower surfaces of the retractable box body 1, the first housing 11 and the second housing 12 may be assisted to move relatively in a linear direction, so as not to deform the overall shape of the box body.

The guide hole 132 penetrates through the first housing 11, and the guide groove 133 is arranged on the lower surface of the second housing 12, opposite to the guide hole 132. The guide post 134 protrudes from the bottom of the guide groove 133, with a front end extending into the guide hole 132. The guide post 134 is a right cylinder, with a circular, elliptical or rectangular cross section, or the like.

In the case that the number of the retractable device 13 is three or more, the center of gravity of the retractable box body 1 is located on a central axis of the three-dimensional structure enclosed by the plurality of retractable devices 13. In the present embodiment, four retractable devices 13 enclose a three-dimensional structure with a shape of rectangular parallelepiped, and the center of gravity of the retractable box body 1 is located on a central axis of this rectangular parallelepiped, so as not to adversely affect the wire stripping effect due to a stress imbalance at a certain side when the upper and lower surfaces of the retractable box body 1 are pressed.

As shown in FIGS. 3 and 5, the retractable device 13 further includes an annular step 135, an annular gasket 136 and a bolt 137. The annular step 135 protrudes from the middle of the inner side wall of the guide hole 132; one stepped hole 1351 is formed in the middle of the annular step 135. The annular gasket 136 is arranged in the guide hole 132, and is located below the annular step 135, and a through hole 1361 of the gasket is arranged in the middle of the annular gasket 136, opposite to the stepped hole 351. The bolt 137 includes a base 1371 and a threaded rod 1372 which are integrally arranged, the base 1371 is arranged in the guide hole 132, and is located below the annular gasket 136; the threaded rod 1372 passes through the annular gasket 136 and the annular step 135 successively and is connected to the guide post 134. To be specific, the threaded rod 1372 passes through the through hole 1361 of the gasket and the stepped hole 1351 successively and is connected to the guide post 134.

Any or a plurality of guide posts 134 may be sheathed with at least one spiral spring 131. Preferably, four guide posts are sheathed with four compression springs. One end of the compression spring is arranged in the guide hole 132, and connected to the upper surface of the annular step 135, and the other end thereof is arranged in the guide groove 133 corresponding to the guide hole 132. In the present embodiment, the central axis of the spiral spring 131 is vertical to the lower surface of the first housing 11 or the upper surface of the second housing 12.

In the case that opposite pressing forces are exerted simultaneously on the box body top surface and the box body bottom surface, the spiral spring is compressed, and the first housing 11 and the second housing 12 are moved relatively close to each other; when the first housing 11 and the second housing 12 are engaged, the threaded rod 1372 arranged at a front end of the guide post 134 slides downwardly in the through hole 1361 of the gasket and the stepped hole 1351. In the case that the pressures on the box body top surface and box body bottom surface disappear, the first housing 11 and the second housing 12 are moved oppositely away from each other; in the case that the spiral spring restores to its original shape, the relative location between the first housing 11 and the second housing 12 restores to the initial state.

As shown in FIG. 1, in the present embodiment, four wire stripping devices 2 are arranged on four side walls of the box body respectively, for partially or entirely stripping the wire sheath covering the wire core.

The wire stripping device 2 includes a first blade 21 and a second blade 22. When the box body side wall is a plane, the first blade 21 and the second blade 22 are planar blades; when the box body side wall is a curved surface, the first blade 21 and the second blade 22 are cambered blades, and have the same or corresponding cross-sectional shape as or to the box body side wall.

Figure 2:
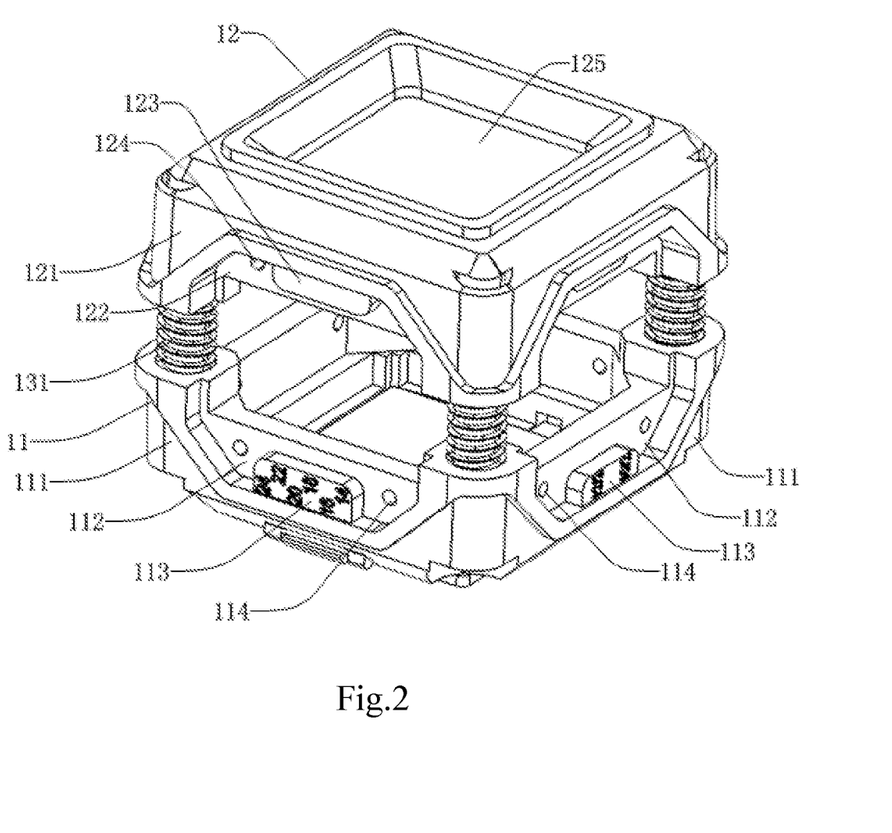
FIG. 2 is a structural schematic diagram of a first housing, a second housing and a retractable device in Embodiment 1 according to the present invention.

As shown in FIG. 2, the first blade 21 is detachably assembled to one first housing side wall 111, with its edge facing toward the second housing 12. The second blade 22 is detachably assembled to one second housing side wall 121, located on the same plane as the first housing side wall 111, with its edge facing towards the first housing 11. When the retractable box body 1 is compressed to the minimum height, the inner side wall of the first blade 21 is tangent to the outer side wall of the second blade 22.

Figure 4:
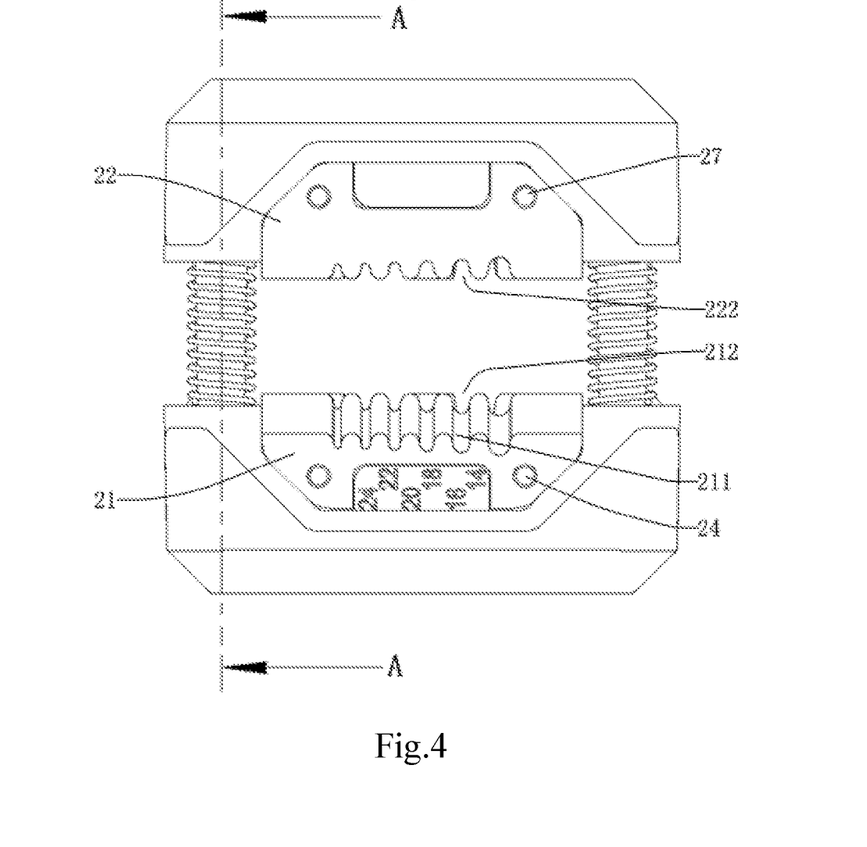
FIG. 4 is a structural schematic diagram of one side surface in Embodiment 1 according to the present invention.
Figure 6:
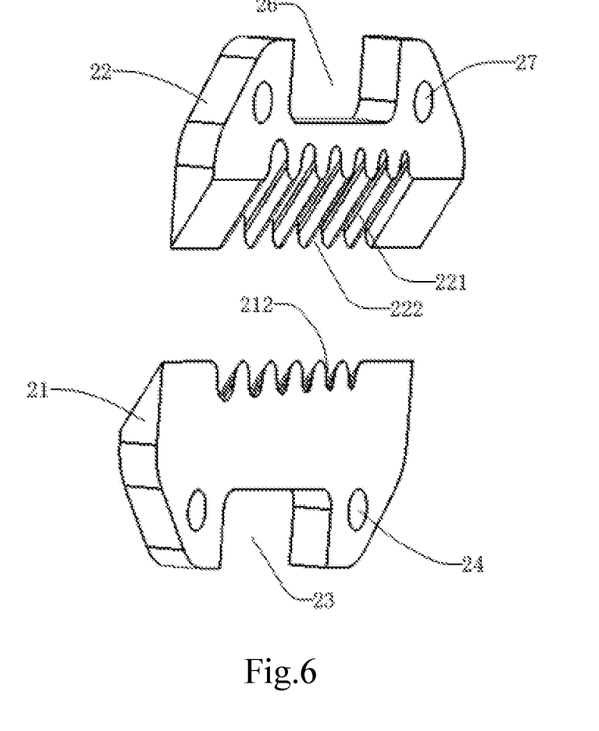
FIG. 6 is a structural schematic diagram of a first blade and a second blade in Embodiment 1 according to the present invention.

As shown in FIGS. 4 and 6, the outer side wall of the first blade 21 is provided with at least one recessed first edge groove 211, and extends to the edge of the first blade 21, forming a first edge notch 212; the inner side wall of the second blade 22 is provided with at least one recessed second edge groove 221, and extends to the edge of the second blade 22, forming a second edge notch 222. The second edge notch 222 is arranged opposite to the first edge notch 212. The first edge notch 212 and the second edge notch 222 have semi-circular bottom, for disposing wires. The wire includes a wire core and a wire sheath covering the wire core.

Figure 7:
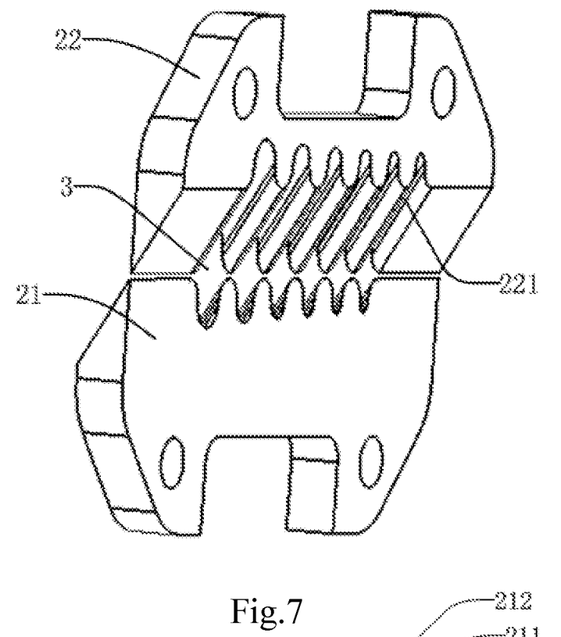
FIG. 7 is a structural schematic diagram of a wire stripping hole in Embodiment 1 according to the present invention.

The height of the top end of the edge of the first blade 21 is larger than the height of the highest point of the first housing 11, and the height of the lowest end of the edge of the second blade 22 is less than the height of the lowest point of the second housing 12. In the course of compressing the retractable box body 1, the first edge notch 212 gradually approaches the second edge notch 222. When the height of the lowest end of the edge of the second blade 22 is equal to or less than the height of the top end of the edge of the first blade 22, as shown in FIG. 7, the first edge notch 212 and the second edge notch 222 which are corresponding to each other define a wire stripping hole 3. An inner side of the wire stripping hole 3 is the edge of the first blade 21 or the second blade 22. The wire stripping hole 3 has a cross-sectional shape corresponding to or same as that of any wire core, and may be circular or of other shapes. One wire stripping device 2 may be provided thereon with one or plural wire stripping holes 3, corresponding to the wires of a variety of different diameters respectively. When the lowest end of the edge of the second blade 22 flushes with the top end of the edge of the first blade 21, the length, the inner diameter and the area of the wire stripping hole 3 are at the maximum; when the retractable box body 1 is compressed to the minimum height, the lower end of the second housing 12 is fitted to the upper end of the first housing 11, and the length, the inner diameter and the area of the wire stripping hole 3 are at the minimum.

An included angle of 0-60 degrees is formed between a central axis of the first edge groove 211 or the second edge groove 221 and the box body side wall, for disposing the wires and preventing the wires from creeping down. The widest portion of the wire core is less than the minimal length of the wire stripping hole 3, so as not to cut off the wire core by mistake in the course of cutting the wire sheath. Preferably, the widest portion of the wire sheath is less than the maximal length of the wire stripping hole 3, such that the wire may be stably disposed in the wire stripping hole. When a certain wire can be disposed in the first edge groove 211 or the second edge groove 221, and the widest portion of the wire core is less than the minimal length of the wire stripping hole 3, the wire sheath can be stripped off from the wire core by the wire stripping hole 3. It can be considered that the wire forms a corresponding relation with the first edge groove 211 or the second edge groove 221.

In the course of compressing the retractable box body 1, when the first edge notch 212 and the second edge notch 222 enclose the wire stripping hole 3, the part of the wire to be stripped is located in the wire stripping hole 3. Afterwards, the retractable box body 1 is continuously compressed, the wire stripping hole 3 becomes smaller gradually, and the wire sheath outside the wire would be cut by the edge at the inner side of the wire stripping hole 3 partially or entirely, forming a cutout of the wire sheath. However, the wire core of the wire is neither fixed by the wire stripping hole 3, nor cut off. When the retractable box body 1 is compressed to the minimum height, and an outward tensile force is exerted on the part of the wire located outside the retractable box body 1, the cutout of the wire sheath is further enlarged, such that the two parts of the wire sheath inside and outside the retractable box body 1 are separately completely, while the wire core at the inner layer of the wire is able to slide out of the wire stripping hole 3, such that a segment of wire core not coated by the wire sheath is exposed from one end of the wire, but the stripped wire sheath is left in the retractable box body 1.

The first blade 21 is detachably assembled to one first housing side wall 111, and the second blade 22 is detachably assembled to one second housing side wall 121. In the present embodiment, the blade and the side wall of the housing are combined into a detachable structure, as shown in the following.

As shown in FIGS. 2 and 6, the ridge of the first blade 21 is provided with a first blade latching slot 23, the outer surface of the first housing side wall 111 is provided with a recessed first housing side wall groove 112, and the bottom surface of the first housing side wall groove 112 is provided with one protruding first housing side wall block 113, snap fitted into the first blade latching slot 23. The ridge of the second blade 22 is provided with a second blade latching slot 26, the outer surface of the second housing side wall 121 is provided with a recessed second housing side wall groove 122, and the bottom surface of the second housing side wall groove 122 is provided with one protruding second housing side wall block 123, snap fitted into the second blade latching slot 26.

As shown in FIGS. 3 and 6, the first blade 21 is provided with two first blade through holes 24, the first housing side wall 111 is provided with two first housing side wall through holes 114, positionally corresponding to the two first blade through holes 24. The wire stripping device 2 further includes two first fasteners 25, which are bolts including a threaded rod and a nut, passing through the first blade through hole 24 and the first housing side wall through hole 114 successively, for fixing the first blade 21 and the first housing 11 together. The second blade 22 is provided with two second blade through holes 27, the second housing side wall 121 is provided with two second housing side wall through holes 124, positionally corresponding to the two second blade through holes 27. The wire stripping device 2 further includes two second fasteners 28, which are bolts including a threaded rod and a nut, passing through the second blade through hole 27 and the second housing side wall through hole 124 successively, for fixing the second blade 22 and the second housing 12 together.

In a variation of the present embodiment, the blade and the side wall of the housing are combined into another detachable structure as shown in the following.

Figure 8:
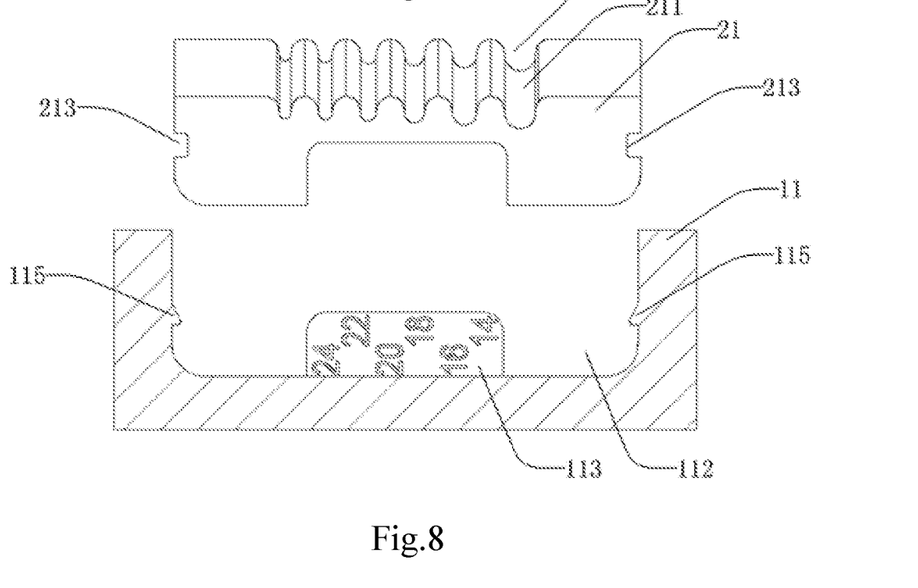
FIG. 8 is a structural schematic diagram of a first blade and a first housing side wall groove in Embodiment 1 according to the present invention.

As shown in FIG. 8, two or more first blade snap notches 213 are arranged at the edges of the two ends of the first blade 21, two or more protruding first snap protrusions 115 are arranged at the inner side wall of the first housing side wall groove 112, and each first snap protrusion 115 is snap fitted into one first blade snap notch 213. The ridge of the first blade 21 is fixed to the bottom of the first housing side wall groove 112, and the edges of the two ends of the first blade 21 are fixed to the inner side wall of the first housing side wall groove 112 respectively, thereby fixing the entire first blade 21 to the first housing side wall 111.

Figure 9:
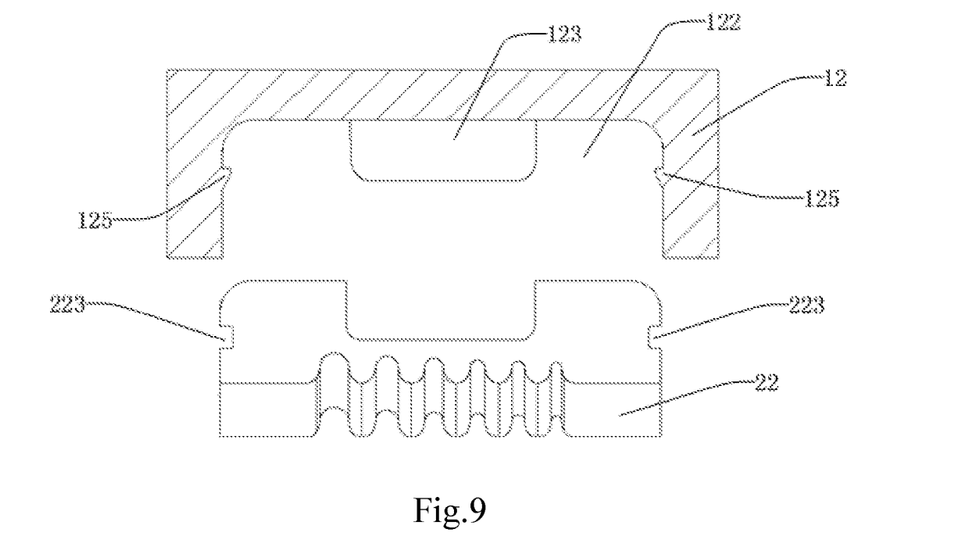
FIG. 9 is a structural schematic diagram of a second blade and a second housing side wall groove in Embodiment 1 according to the present invention.

Similarly, as shown in FIG. 9, two or more second blade snap notches 223 are arranged at the edges of the two ends of the second blade 22 respectively, two or more protruding second snap protrusions 125 are arranged at the inner side wall of the second housing side wall groove 122, and each second snap protrusion 125 is snap fitted into one second blade snap notch 223. The ridge of the second blade 22 is fixed to the bottom of the second housing side wall groove 122, and the edges of the two ends of the second blade 22 are fixed to the inner side wall of the second housing side wall groove 122 respectively, thereby fixing the entire second blade 22 to the second housing side wall 121.

In the present embodiment, the retractable box body 1 has a relatively small volume. A user may put two fingers on the upper and lower surfaces of the retractable box body upon compressing the box body. The retractable box body 1 further includes a sunken groove 126 recessed into the upper surface of the second housing 12, that is the upper surface of the retractable box body 1. The sunken groove 126 has a shape similar to a circular truncated cone. The user has his or her pad of finger located in the sunken groove 126 upon pressing the box body, for exerting a force, so as to prevent the finger from sliding during pressing. Similarly, the retractable box body 1 may further include another sunken groove (not shown in the drawing), recessed into the lower surface of the first housing 11, that is the lower surface of the retractable box body 1.

As shown in FIG. 1, in order to reduce the cost of materials, the main structure of the retractable box body 1, such as the first housing 11 and the second housing 12, is preferably made of a rigid plastic material. The retractable box body 1 has a relatively small volume and smooth surface, thus easily slipping out of the user's hand, causing damage. In order to solve such a problem, the retractable box body 1 may further include a first shell 14 and a second shell 15, in which the outer surface of the first housing 11 is coated by the first shell 14 partially or entirely; the outer surface of the second housing is coated by the second shell 15 partially or entirely. In the present embodiment, preferably, the surface of all housing arrises and housing corners of the first housing 11 are coated by the first shell 14, and the surface of all housing arrises and housing corners of the second housing 12 are coated by the second shell 15. The housing arris refers to a line of a joint of any two adjacent outer surfaces of the first housing 11 or the second housing 12, and the housing corner refers to a point of a joint of any three adjacent outer surfaces of the first housing 11 or the second housing 12.

Once the retractable box body 1 falls down on the ground, usually, the housing arris and the housing corner collide with the ground, which causes damages to the retractable box body 1. In the present embodiment, the first shell 14 and/or the second shell 15 are/is made of an elastic material, which has a buffering function, and effectively protects the first housing 11 and the second housing 12.

As shown in FIG. 1, in the present embodiment, the space between the upper surface of the first housing 11 and the lower surface of the second housing 12 forms a box cavity 16 inside the retractable box body 1. After the user strips the wire by using any one wire stripping device 2 on four side walls of the box body, the stripped wire sheath would be left in the box cavity 16. The user may clean up all the left wire sheath at a time after stripping the wires many times.

As shown in FIG. 1, the retractable box body 1 further includes a base plate 17, detachably mounted to the first housing 11 and/or the second housing 12. In the case that much wire sheath left in the box cavity 16 may adversely affect the process of stripping wires, the user may remove the base plate 17 to pour out the left wire sheath from the box cavity 16.

As shown in FIG. 1, the present embodiment further includes a scale marking 18 arranged on the outer side wall of the retractable box body 1, preferably, on the surface of the first housing side wall block 113 of the first housing 11, for measuring the length of the wire, particularly the length of the wire with the sheath to be removed.

The present embodiment provides a box-type wire stripper, which is provided with four wire stripping devices, may strip wires of a variety of different models and sizes, and satisfies the wire stripping requirements of most of the users. The box-type wire stripper according to the present embodiment is simple to operate, convenient to carry, and is advantageous for large-scale application.

Embodiment 2

Figure 10:
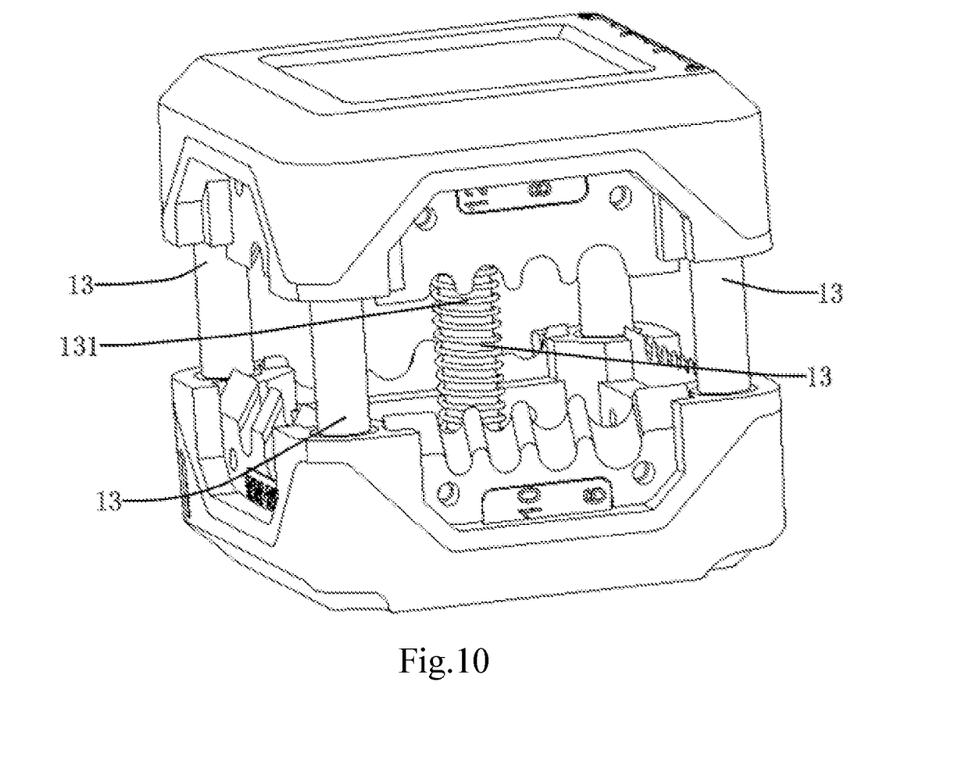
FIG. 10 is an overall structural schematic diagram of Embodiment 2 according to the present invention.

The present embodiment provides a box-type wire stripper for stripping various wires. The present embodiment includes most technical solutions in Embodiment 1, with the distinctive technical feature as follows. As shown in FIG. 10, the retractable box body 1 includes five retractable devices 13, similar to Embodiment 1, four of which are respectively arranged at four corners of the retractable box body 1 with the shape of rectangular parallelepiped or cube and are not provided with an elastic member; the fifth retractable device is arranged in the midpoint of the retractable box body 1, and is provided with the elastic member.

In the present embodiment, four retractable devices 13 enclose a three-dimensional structure with a shape of rectangular parallelepiped, each including a guide hole 132, a guide groove 133, a guide post 134, an annular step 135, an annular gasket 136 and a bolt 137. The four retractable devices 13 assist the first housing 11 and the second housing 12 to move relatively in a linear direction, so as not to deform the overall shape of the retractable box body 1.

The fifth retractable device 13 is arranged on a central axis of the rectangular parallelepiped. The center of gravity of the retractable box body 1 is located on the central axis of the fifth retractable device 13, so as not to adversely affect the wire stripping effect due to a stress imbalance at a certain side of the retractable box body 1.

The fifth retractable device 13 includes a spiral spring 131, a guide hole 132, a guide groove 133, a guide post 134, an annular step 135, an annular gasket 136 and a bolt 137. The spiral spring 131 is configured to sheath the guide post 134, and is deformed to generate an elastic force which is great enough to support the second housing 12. The fifth retractable device 13 has the same specific structure as the retractable device 13 in Embodiment 1, and is not repeated herein. The fifth retractable device 13 may be used for mounting the spiral spring 131, and for assisting the first housing 11 and the second housing 12 to move relatively in a linear direction, so as not to deform the overall shape of the retractable box body 1.

Other technical features of the present embodiment are the same as those in Embodiment 1, and are not repeated herein.

The present embodiment provides a box-type wire stripper, which is provided with four wire stripping devices, may strip wires of various models and sizes, and satisfies the wire stripping requirements of most of the users. The box-type wire stripper according to the present embodiment only needs one spiral spring to be mounted, which effectively reduces the costs of raw materials and simplifies the assembly process. Moreover, the box-type wire stripper according to the present embodiment is simple to operate, convenient to carry, and is advantageous for large-scale application.

Embodiment 3

Figure 11:
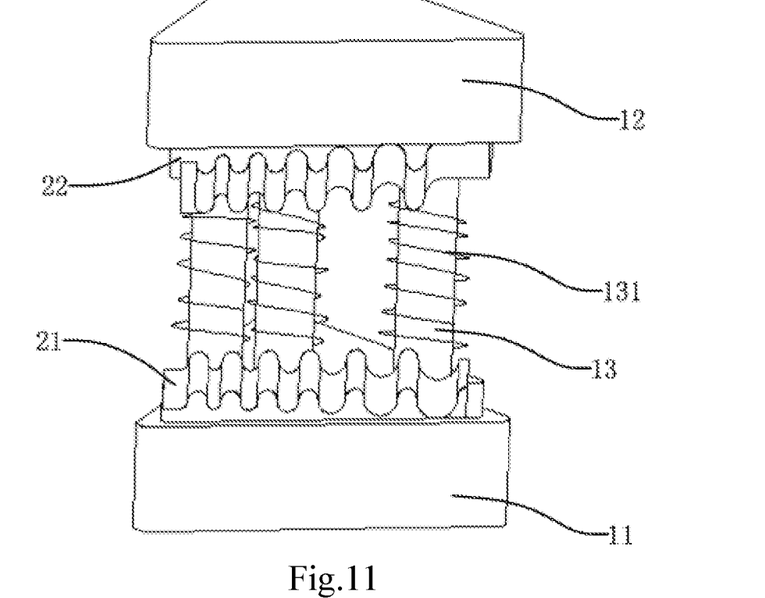
FIG. 11 is an overall structural schematic diagram of Embodiment 3 according to the present invention.

The present embodiment provides a box-type wire stripper for stripping various wires. The present embodiment includes most technical solutions in Embodiment 1, with the distinctive technical feature that the retractable box body 1 is a triangular prism, including a box body bottom surface, a box body top surface, and three box body side walls of which are preferably planes, and may be arc surfaces.

The retractable box body 1 includes a first housing 11, a second housing 12 arranged opposite to each other, and three retractable devices 13 therebetween. The three retractable devices 13 are arranged at three corners of the retractable box body 1 respectively, and enclose a three-dimensional structure with a shape of triangular prism. The center of gravity of the retractable box body 1 is located on the central axis of the three-dimensional structure, so as not to adversely affect the wire stripping effect due to a stress imbalance at a certain side of the retractable box body 1; meanwhile, it is ensured that the retractable box body 1 is force-balanced in a horizontal direction, the first housing 11 and the second housing 12 are not rotatable relatively, and any one retractable device 13 is the same as Embodiment 1.

Other technical features of the present embodiment are the same as those in Embodiment 1, and are not repeated herein.

The present embodiment provides a box-type wire stripper, which is provided with three wire stripping devices, may strip wires of a variety of different models and sizes, and satisfies the wire stripping requirements of most of the users. Compared with the technical solution in Embodiment 1, the box-type wire stripper according to the present embodiment has a relatively small volume and relatively low material costs, and is convenient to carry.

Embodiment 4

Figure 12:
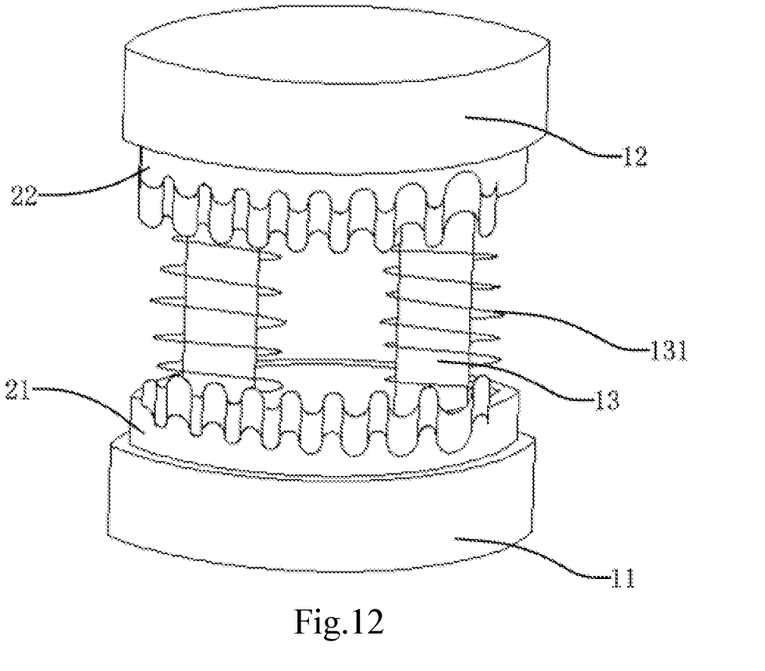
FIG. 12 is an overall structural schematic diagram of Embodiment 4 according to the present invention.

The present embodiment provides a box-type wire stripper for stripping various wires. The present embodiment includes most technical solutions in Embodiment 1, with the distinctive technical feature that the retractable box body 1 is a column, with a cross section being a pattern enclosed by two arc segments or a linear segment and one arc segment. The retractable box body 1 includes one box body bottom surface, one box body top surface and two box body side walls.

The two box body side walls are preferably two arc surfaces, or one plane and one arc surface. The retractable box body 1 includes a first housing 11, a second housing 12 arranged opposite to each other, and two retractable devices 13 therebetween. The two retractable devices 13 are arranged at the edges of the two ends of the retractable box body 1 respectively, and have the central axis located in the same plane and parallel with each other. A connection surface is formed between the two retractable devices 13. The center of gravity of the retractable box body 1 is located on the central line of the connection surface of the two retractable devices, so as not to adversely affect the wire stripping effect due to a stress imbalance at a certain side of the retractable box body 1. Meanwhile, it is ensured that the retractable box body 1 is force-balanced in a horizontal direction, such that the first housing 11 and the second housing 12 are not rotatable relatively, and any one retractable device 13 is the same as Embodiment 1.

The wire stripping device 2 includes a first blade 21 and a second blade 22. In the case that the box body side wall is a plane, the first blade 21 and the second blade 22 are planar blades; in the case that the box body side wall is a curved surface, the first blade 21 and the second blade 22 are cambered blades.

Other technical features of the present embodiment are the same as those in Embodiment 1, and are not repeated herein.

The present embodiment provides a box-type wire stripper, which is provided with two wire stripping devices, may strip wires of a variety of different models and sizes, and satisfies the wire stripping requirements of most of the users. Compared with the technical solution in Embodiment 1, the box-type wire stripper according to the present embodiment has a relatively small volume and relatively low costs, and is convenient to carry.

Embodiment 5

Figure 13:
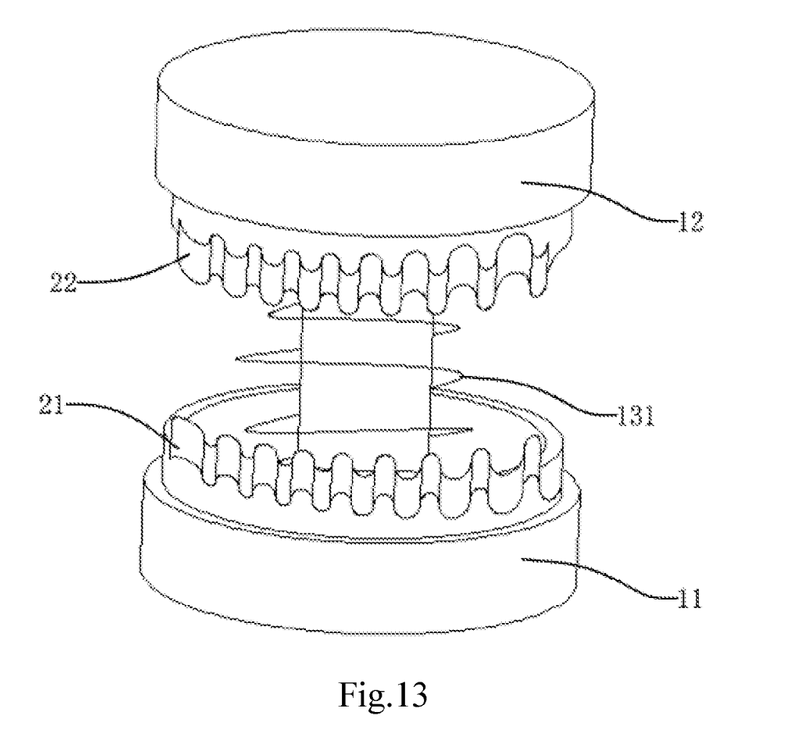
FIG. 13 is an overall structural schematic diagram of Embodiment 5 according to the present invention.

The present embodiment provides a box-type wire stripper for stripping various wires. The present embodiment includes most technical solutions in Embodiment 1, with the distinctive technical feature that the retractable box body 1 is a cylinder or an elliptical column, with a circular or elliptical cross section, including one box body bottom surface, one box body top surface and one box body side wall. The box body side wall is an annular curved surface.

The retractable box body 1 includes a first housing 11 and a second housing 12 arranged opposite to each other, and one retractable devices 13 therebetween. The retractable device 13 is arranged at the central axis of the retractable box body 1, and the center of gravity of the retractable box body 1 is located on the central axis of the retractable device 13, so as not to adversely affect the wire stripping effect due to a stress imbalance at a certain side of the retractable box body 1; meanwhile, it is ensured that the retractable box body 1 is force-balanced in a horizontal direction, the first housing 11 and the second housing 12 are not rotatable relatively, and any one retractable device 13 is the same as Embodiment 1.

The wire stripping device 2 includes a first blade 21 and a second blade 22. Since the box body side wall is an annular curved surface, the first blade 21 and the second blade 22 are also annular cambered blades.

Other technical features of the present embodiment are the same as those in Embodiment 1, and are not repeated herein.

The present embodiment provides a box-type wire stripper, which is provided with an annular wire stripping device, may strip wires of a variety of different models and sizes, and satisfies the wire stripping requirements of most of the users. Compared with the technical solution in Embodiment 1, the box-type wire stripper according to the present embodiment has a relatively small volume and relatively low costs, and is convenient to carry.

The invention has been exemplified above with reference to specific embodiments. However, it should be understood that a multitude of modifications and variations can be made by a common person skilled in the art based on the conception of the present invention. Therefore, any technical schemes, acquired by the person skilled in the art based on the conception of the present invention through logical analyses, deductions or limited experiments, fall within the scope of the invention as specified in the claims.

The invention claimed is:

1. A box-type wire stripper, comprising
a retractable box body with a variable height, comprising at least one side wall; and
at least one wire stripping device for partially or entirely stripping a wire sheath covering a wire core,
each wire stripping device arranged on one of the at least one side wall;
wherein the retractable box body comprises
a first housing;
a second housing, arranged opposite to the first housing; and
at least one retractable device, for adjusting a distance between the second housing and the first housing;
wherein
a side wall of the retractable box body is a plane or a curved surface, comprising
a first housing side wall, which is one side wall of the first housing; and
a second housing side wall, which is one side wall of the second housing;
wherein the wire stripping device comprises
a first blade, arranged on one first housing side wall, with an edge facing toward the second housing; and
a second blade, arranged on one second housing side wall, with an edge facing toward the first housing, the second housing side wall and the first housing side wall are located on the same side wall of the retractable box body;
when the retractable box body is compressed to the minimum height, an inner side wall of the first blade is tangent to an outer side wall of the second blade;
wherein the wire stripping device comprises
a first blade latching slot, arranged at a ridge of the first blade;
a first housing side wall groove, recessed in an outer surface of the first housing side wall;
a first housing side wall block, protruding from a bottom surface of the first housing side wall groove, and snap fitted into the first blade latching slot a second blade latching slot, arranged at a ridge of the second blade;
a second housing side wall groove, recessed in an outer surface of the second housing side wall; and
a second housing side wall block, protruding from a bottom surface of the second housing side wall groove, and snap fitted into the second blade latching slot.

2. The box-type wire stripper according to claim 1, wherein the retractable device comprises
a guide hole, penetrating through the first housing;
a guide groove, arranged on a lower surface of the second housing, opposite to the guide hole; and
a guide post, protruding from the bottom of the guide groove, with a front end extending into the guide hole.

3. The box-type wire stripper according to claim 2, wherein the retractable device comprises
an annular step, protruding from the middle of an inner side wall of the guide hole;
an annular gasket, arranged in the guide hole and located below the annular step; and
a bolt, comprising integrally arranged
a base, arranged in the guide hole, and located below the annular gasket; and
a threaded rod, passing through the annular gasket and the annular step successively and connected to the guide post.

4. The box-type wire stripper according to claim 3, wherein
a stepped hole is formed in the middle of the annular step;
a gasket through hole is arranged in the middle of the annular gasket, opposite to the stepped hole;
the threaded rod passes through the gasket through hole and the stepped hole successively and is connected to the guide post.

5. The box-type wire stripper according to claim 3, wherein the retractable device comprises
an elastic member, with one end connected to the first housing, and the other end connected to the second housing.

6. The box-type wire stripper according to claim 5, wherein
the elastic member is a compressible spiral spring, sheathing the guide post;
one end of the elastic member is arranged in the guide hole, and is connected to an upper surface of the annular step; the other end of the elastic member is arranged in the guide groove corresponding to the guide hole.

7. The box-type wire stripper according to claim 1, wherein the first blade is detachably assembled to the first housing side wall;
the second blade is detachably assembled to the second housing side wall.

8. The box-type wire stripper according to claim 1, wherein the wire stripping device comprises:
two or more first blade snap notches, arranged at the edges of two ends of the first blade respectively;
two or more first snap protrusions, protruding from the inner side wall of the first housing side wall groove, each first snap protrusion snap fitted into one first blade snap notch;
two or more second blade snap notches, arranged at the edges of two ends of the first blade respectively; and
two or more second snap protrusions, protruding from the inner side wall of the first housing side wall groove, each second snap protrusion snap fitted into one first blade snap notch.

9. The box-type wire stripper according to claim 1, wherein the wire stripping device comprises
at least one first edge groove, recessed in an outer side wall of the first blade, and extending to the edge of the first blade, forming a first edge notch; and
at least one second edge groove, recessed in an inner side wall of the second blade, and extending to the edge of the second blade, forming a second edge notch, disposed opposite to the first edge notch.

10. The box-type wire stripper according to claim 9, wherein
in the course of compressing the retractable box body,
when the height of the lowest end of the edge of the second blade is equal to or less than the height of the top end of the edge of the first blade, the first edge notch and the second edge notch corresponding to each other enclose a wire stripping hole;
the length of the wire stripping hole is directly proportional to the height of the retractable box body.

11. The box-type wire stripper according to claim 9, wherein
an included angle of 0-60 degrees is formed between a central axis of the first edge groove and the second edge groove and the side wall of the box body.

12. The box-type wire stripper according to claim 1, wherein
when the number of the retractable device is one, a center of gravity of the retractable box body is located on the central axis of the retractable device;
when the number of the retractable device is two, the center of gravity of the retractable box body is located on a center line of a connection surface of the two retractable devices;
when the number of the retractable device is three or more, the center of gravity of the retractable box body is located on the central axis of a three-dimensional structure enclosed by a plurality of retractable devices.

13. The box-type wire stripper according to claim 1, wherein the retractable box body comprises
a sunken groove, recessed in the lower surface of the first housing; and/or recessed in the upper surface of the second housing.

14. The box-type wire stripper according to claim 1, wherein the retractable box body comprises
a first shell, partially or entirely covering an outer surface of the first housing; and
a second shell, partially or entirely covering an outer surface of the second housing;
the first shell and/or the second shell is made of an elastic material.

15. The box-type wire stripper according to claim 1, wherein the retractable box body comprises
a base plate, detachably mounted to the first housing, and/or the second housing; and/or a scale marking, arranged on an outer side wall of the retractable box body, for measuring the length of the wire.

* * * * *